United States Patent [19]

Fitzgerald

[11] Patent Number: 5,674,961

[45] Date of Patent: Oct. 7, 1997

[54] OIL WATER AND SOLVENT RESISTANT PAPER BY TREATMENT WITH FLUOROCHEMICAL COPOLYMERS

[75] Inventor: John J. Fitzgerald, Newark, Del.

[73] Assignee: E. I. du Pont de Nemours and Company, Wilmington, Del.

[21] Appl. No.: 631,594

[22] Filed: Apr. 12, 1996

[51] Int. Cl.$^6$ ............... C08F 224/00; C08F 220/24; C08F 226/02; C08F 220/10; D21H 17/38
[52] U.S. Cl. ............... 526/273; 526/245; 526/310; 526/328.5; 526/288; 162/168.1; 162/168.5
[58] Field of Search ............... 526/273, 245, 526/288, 310, 328.5

[56] References Cited

U.S. PATENT DOCUMENTS

| | | | |
|---|---|---|---|
| 4,013,627 | 3/1977 | Temple | 526/245 |
| 4,147,851 | 4/1979 | Raynolds | 526/245 |
| 4,366,299 | 12/1982 | Dessaint | 526/243 |
| 4,525,423 | 6/1985 | Lynn et al. | 428/421 |
| 4,579,924 | 4/1986 | Schwartz et al. | 526/243 |
| 5,247,008 | 9/1993 | Michels et al. | 524/544 |

FOREIGN PATENT DOCUMENTS

| | | | |
|---|---|---|---|
| 5082569 | 11/1992 | Canada | C08F 220/22 |
| 4132729 | 5/1992 | Japan . | |

Primary Examiner—Joseph L. Schofer
Assistant Examiner—Wu C. Cheng

[57] ABSTRACT

A copolymer composition for treating paper and paper products to impart water, oil or grease repellency comprising monomers copolymerized in the following percentages by weight:

(a) from about 60% to about 90% of at least one monomer of formula I:

$$R_f\text{-}Q\text{-}A\text{-}C(O)\text{-}C(R)=CH_2 \qquad \text{I}$$

wherein $R_f$ is a $C_{2\text{-}20}$ straight or branched-chain perfluoroalkyl group, R is H or $CH_3$, A is O, S, or N(R'), wherein R' is H or a $C_{1\text{-}14}$ alkyl, Q is $C_{1\text{-}15}$ alkylene, $C_{3\text{-}15}$ hydroxyalkylene, —$(C_nH_{2n})(OC_qH_{2q})_m$—, —$SO_2$—$NR'(C_nH_{2n})$—, or —$CONR'(C_nH_{2n})$—, wherein R' is H or $C_{1\text{-}4}$ alkyl, n is 1 to 15, q is 2 to 4, and m is 1 to 15;

(b) from about 10% to about 40% of at least one monomer of formula II:

$$(R_1)_2N\text{—}CH_2CH_2\text{—}O\text{—}C(O)\text{—}C(R_2)=CH_2 \qquad \text{II}$$

wherein $R_1$ is $C_{1\text{-}3}$ alkyl, $R_2$ is H or a $C_{1\text{-}4}$ alkyl radical, and wherein the nitrogen is from about 40% to 100% salinized; and, (c) from about 1% to about 7% of at least one monomer of formula III or IV, or a mixture thereof:

$$\underset{\diagdown\quad\diagup}{\overset{O}{\quad}}\\ CH_2\text{—}CH\text{—}CH_2\text{—}O\text{—}C(O)\text{—}C(R_3)=CH_2 \qquad \text{III}$$

or $$Cl\text{—}CH_2\text{—}CH(OH)CH_2\text{—}O\text{—}C(O)\text{—}C(R_4)=CH_2 \qquad \text{IV},$$

wherein $R_3$ and $R_4$ are each independently H or the same or different $C_{1\text{-}4}$ alkyl radical is disclosed.

9 Claims, 1 Drawing Sheet

OIL WATER AND SOLVENT RESISTANT PAPER BY TREATMENT WITH FLUOROCHEMICAL COPOLYMERS

FIELD OF THE INVENTION

This invention relates to fluorochemical copolymers and their application to paper and similar products to impart repellency to water, oil, or grease.

BACKGROUND OF THE INVENTION

The paper industry makes a large variety of packagings for food use. A stain or leak-proof barrier is required for paper that comes into contact with oily, greasy or watery foods. Polymeric barriers such as polyethylene are costly to apply to paper and interfere with its repulpability or recyclability after its intended use, and are being increasingly restricted by regulations. Fluorine-containing chemicals and copolymers, collectively referred to as fluorochemicals, have been used for a number of years to impart water, oil and grease resistance to substrates such as paper because of their effectiveness at low concentrations and their adaptability to conventional methods of manufacturing paper. For example, U.S. Pat. No. 4,147,851 of Raynolds issued Apr. 3, 1979 discloses that copolymers comprising 50 to 85 weight % of a perfluoroaliphatic acrylate/methacrylate monomer and 50 to 15 weight % dialkylaminoalkyl acrylate/methacrylate monomer or the corresponding amine salt, quaternary or amine oxide monomer are useful in oil and water repellency applications.

Fluorochemicals are generally applied to such materials either by surface application to the paper or by addition to the paper pulp before the paper is formed. Surface application may be carried out by means such as spraying, dipping, roller-coating or padding to apply the fluorochemical to one or both sides of the essentially finished product. This type of treatment has the advantage that the overall amount of fluorochemical on the paper is directly controllable since there is a limited opportunity for loss at this stage of the process. It has the disadvantage that the fluorochemical is applied primarily to the surface of the paper and may offer only limited protection to deeper liquid penetration.

Alternatively, the fluorochemical can be added to the paper pulp under appropriate conditions that all or the majority of the fluorochemical is retained by the paper after it is dewatered. In this type of treatment the fluorochemical is applied throughout the thickness of the paper, not primarily just to the surface. This more uniform treatment is particularly important in providing resistance to penetrating liquids if the paper is creased or abraded in some areas. The disadvantage of this type of treatment is that special conditions must be established to insure that the fluorochemical is retained by the paper, i.e., is not lost in the water removal step of paper formation. For either method of application, the key measurement of performance for these fluorochemicals is their ability to repel or resist materials such as oil, grease, water and similar materials at a low level of fluorine content.

Another important characteristic for these fluorochemicals is their stability under high-shear conditions. In paper mills, these compounds are often transferred to the application area by high-shear pumps. In addition, they are typically applied to the paper from rollers, again operating under high-shear conditions. If the fluorochemical is unstable under these conditions, and deposits a coagulum on the rollers or the pumps, it can cause machine stoppage and generally poor application performance.

Fluorine-containing copolymers used for these applications frequently contain cationic groups in order to make them bond to cellulosic fibers, which are anionic under most conditions. These copolymers may be made by emulsion polymerization or solution polymerization. In emulsion polymerization, the monomers are dispersed with a surfactant in an aqueous continuous phase and polymerization is initiated, forming an emulsion of surfactant-dispersed droplets. This type of product has the potential problem that such emulsions are frequently unstable (i.e. coagulate) under the harsh, high-shear conditions encountered in commercial units. In solution polymerization, one or more of the monomers has a solubilizing ability without the need for a surfactant. This type of product may form a solution or an emulsion, either of which may be more stable under harsh conditions than a surfactant-dispersed product. The use of such a fluorochemical copolymer requires a careful balance between the hydrophilic characterisitics which make it soluble or dispersible in water and the hydrophobic characteristics desirable in the finished paper products. Therefore, in addition to their dispersion stability under high-shear conditions, another important criterion of performance for fluorochemical copolymers is the hydrophobic and oleophobic characteristics of the finished paper products. Still another criterion is achievement of these benefits with a minimum of volatile materials released into the air during application to the paper or paper products. Thus there is a need for compositions which provide improved water, oil or grease repellency to paper and paper products, which are stable under high-shear conditions, and release a minimum of volatile materials into the air during application. The fluorochemical copolymers of the present invention meet these needs and show several key performance advantages over other fluorochemical copolymers previously used for such applications.

SUMMARY OF THE INVENTION

The present invention comprises a copolymer composition which imparts water, oil or grease repellency to paper and paper products comprising monomers copolymerized in the following percentages by weight;

(a) from about 60 to about 90% of at least one monomer of formula I:

$$R_f\text{—}Q\text{—}A\text{—}C(O)\text{—}C(R)\!=\!CH_2 \qquad I$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to about 4 carbom atoms, Q is alkylene of 1 to about 15 carbon atoms, hydroxyalkylene of 3 to about 15 carbon atoms, $\text{—}(C_nH_{2n})(OC_qH_{2q})_m\text{—}$, $\text{—}SO_2\text{—}NR'(C_nH_{2n})\text{—}$, or $\text{—}CONR'(C_nH_{2n})\text{—}$, wherein R' is H or an alkyl of 1 to about 4 carbon atoms, n is 1 to about 15, q is 2 to about 4, and m is 1 to about 15;

(b) from about 10 to about 40% of at least one monomer of formula II:

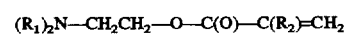
$$(R_1)_2N\text{—}CH_2CH_2\text{—}O\text{—}C(O)\text{—}C(R_2)\!=\!CH_2 \qquad II$$

wherein $R_1$ is an alkyl group of from 1 to about 3 carbon atoms, $R_2$ is H or an alkyl radical of 1 to about 4 carbon atoms, and wherein the nitrogen is from about 40% to 100% salinized; and, (c) from about 1 to about 7% of at least one monomer of formula III or IV, or a mixture thereof:

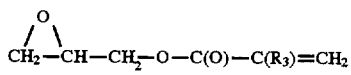   III or $Cl-CH_2-CH(OH)CH_2-O-C(O)-C(R_4)=CH_2$;   IV wherein $R_3$ and $R_4$ are each independently H or the same or different alkyl radical of 1 to about 4 carbon atoms.

The present invention further comprises a method of treating paper or paper products to impart water, oil, or grease repellency comprising application to the surface of the paper or paper product, or addition to the pulp prior to paper or paper product formation, of an effective amount of the copolymer composition of the present invention as described above.

The present invention further comprises a paper or paper product which has been treated with the copolymer composition of the present invention as described above, said treatment comprising application of the composition to the surface of the paper or paper product, or addition of the composition to the pulp prior to formation of the paper or paper product. The treated paper or paper product has a fluorine content of from about 0.04% to about 0.10% by weight.

DETAILED DESCRIPTION OF THE INVENTION

Figure 1A:
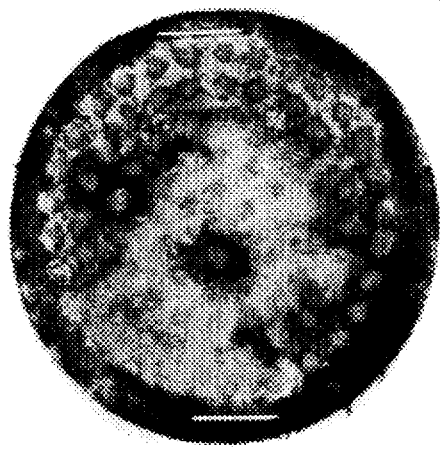
FIG. 1 depicts three black filter cloths through which the copolymer solutions of Examples 1, 2, and commercial sample A, respectively, were filtered. Sample A shows white solid polymeric deposits, while Examples 1 and 2 filtered cleanly leaving no residue.

This invention comprises improved fluorochemical copolymers useful for imparting water, oil and grease resistance to paper and paper products. By paper products is meant paper, paperboard, cardboard and similar products which are made by dewatering a wood or cellulosic (including cotton) aqueous pulp. While the following discussion applies to paper as an example, it generally applies to other paper products as well.

Superior water, oil or grease repellency is imparted to paper and paper products by the addition of the fluorochemical copolymer compositions of the present invention. The composition is added to the paper or paper products in the form of a self-dispersed emulsion or dispersion in water or other solvent. The composition is added either to the paper pulp before paper formation, or is applied to the essentially-finished paper. The copolymer composition of the present invention comprises monomers copolymerized in the following percentages by weight, relative to the total weight of the copolymers:

(a) from about 60 to about 90% of at least one monomer of formula I:

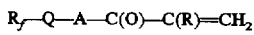   I wherein $R_f$ is a straight or branched-chain perfluoroalkyl group of from 2 to about 20 carbon atoms, R is H or $CH_3$, A is O, S, or N(R'), wherein R' is H or an alkyl of from 1 to about 4 carbon atoms, Q is alkylene of 1 to about 15 carbon atoms, hydroxyalkylene of 3 to about 15 carbon atoms, $-(C_nH_{2n})(OC_qH_{2q})_m-$, $-SO_2-NR'(C_nH_{2n})-$, or $-CONR'(C_nH_{2n})-$, wherein R' is H or an alkyl of 1 to about 4 carbon atoms, n is 1 to 15, q is 2 to 4, and m is 1 to 15;

(b) from about 10 to about 40% of at least one monomer of formula II:

$(R_1)_2N-CH_2CH_2-O-C(O)-C(R_2)=CH_2$   II wherein $R_1$ is an alkyl group of from 1 to about 3 carbon atoms, $R_2$ is H or an alkyl radical of 1 to about 4 carbon atoms, and wherein the nitrogen is 40 to 100% salinized; and, (c) from about 1 to about 7% of at least one monomer of formula III or IV, or a mixture thereof:

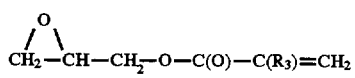   III or $Cl-CH_2-CH(OH)CH2-O-C(O)-C(R_4)=CH_2$   IV;

wherein $R_3$ and $R_4$ are each independently H or the same or different alkyl radicalof 1 to about 4 carbon atoms.

Preferably in the composition of the present invention in Formula I, $R_f$ is a straight chain perfluoroalkyl group of 2 to about 20 carbon atoms, A is O and Q is an alkylene of 1 to about 15 carbon atoms. More preferably the monomer of Formula I is a perfluoroalkylethyl acrylate having the formula $CF_3CF_2(CF_2)_xC_2H_4OC(O)-C(H)=CH_2$ wherein x is an even integer from 4 to 18, or mixtures thereof. Most preferred is a perfluoroalkyl carbon chain length distribution (x) by weight of about 50% of 8-carbon, about 29% of 10-carbon, about 11% of 12-carbon, and with smaller percentages of 6-carbon, 14-carbon and longer chain lengths. Preferably the monomer of Formula II is diethylaminoethyl methacrylate and the monomer of Formula III is glycidyl methacrylate.

The proportion of the monomer of Formula I is at least about 60% relative to the total weight of copolymer. If it is present in lower amounts, the repellency is unacceptably poor. The proportion should be less than about 90%. If it is present in higher amounts, the amounts of the monomer of Formula II and the monomer of Formula III or IV, or mixtures thereof, are too low, resulting in poor dispersibility. Preferably the proportion of the monomer of Formula I in the copolymer is from about 79% to about 85% by weight for the best balance of dispersion stability, solubility and reactivity performance.

Preferably the monomer of Formula II is diethylaminoethyl methacrylate which has undergone partial or full salinization or quarternization. It must be at least about 40% salinized for adequate solubilizing effect, but may be as high as 100%. While a fully salinized material is satisfactory in performance, it releases an unnecessary amount of salinizing agent when the polymer is heated and cured. Preferably the degree of salinization is between about 50% and 100%. The free amine portions of the resulting copolymer can then be reacted with a salinizing agent such as acetic acid, resulting in the conversion of part or all of the amine moieties to the corresponding acetate. Alternatively, the salinization reaction may be carried out on the amine group before the polymerization reaction with equally good results. The salinizing/quaternizing group can be an acetate, halide, sulfate or other known salinizing/quaternizing group.

The proportion of the monomer of Formula II is at least about 10% for adequate solubilization. A proportion above about 40% will impair oil and water repellency. Preferably the proportion of the monomer of Formula II in the copolymer is (as salinized) from about 13% to about 19% by weight.

While not wishing to be bound by theory, it is believed that the monomer of Formula III or IV may act as a reactive site for the polymer to covalently bond to the substrate surface. Preferably the monomer of Formula III is glycidyl methacrylate. It is present in a proportion of at least about 1% to have a noticeable effect. An amount above about 7% may not further improve performance. Preferably the proportion of the monomer of Formula III or IV, or a mixture thereof, in the copolymer is from about 1% to about 5% by weight.

The polymerization of comonomers of Formula I, II, and III or IV or a mixture thereof, to prepare the composition of the present invention, is carried out by contacting the monomers a solvent such as acetone, methylisobutyl ketone, ethyl acetate, isopropanol, and other ketones, esters and alcohols or mixtures thereof. The polymerization is conveniently initiated by any free radical initiators, such as 2,2'-azobis(2,4-dimethylvaleronitrile. These are sold by the E. I. du Pont de Nemours and Co., Wilmington, Del. commercially under the name of "VAZO" 67, 52 and 64, and by Wako Chemicals USA, Ltd., under the name "V-501".

The following tests were used to evaluate the properties of the treated paper with the inventive copolymers and comparative examples: The Cobb Size Test as described in TAPPI 441 os-77 measures the absorptiveness of water in grams per square meter of paper surface using a water head pressure of one centimeter and a time of 120 seconds. The Turpentine Test for Grease Resistance is also described in TAPPI T454 os-77, and measures the time in seconds elapsed before a red-stained turpentine penetrates the paper. A higher number indicates a greater grease resistance. The Ralston-Purina Grease Resistance Test for Pet Food Materials is described in the Ralston-Purina Company Packaging Reference Manual Volume 6. It measures the staining of paper using a specifically supplied Synthetic Oil designed to duplicate the effect of ingredients in pet foods. A higher number represents a greater degree of staining: i.e., poorer grease resistance. The Kit Test, described in TAPPI UM 557, measures the degree of repellency and anti-wicking characterisitics of paper treated with fluorochemical agents by dropping from a height of one inch a drop from one of a series of of certain castor oil, toluene and heptane mixtures numbered from 1 to 12. The Kit Test Rating is the highest numbered solution not showing staining of the paper, with a higher number indicating superior oil resistance.

EXAMPLE 1

A vessel fitted with a stirrer, thermometer, and reflux condenser was charged with 673.5 parts of a fluoromonomer of formula I having the formula: $CF_3CF_2(CF_2)_xC_2H_4OC(O)$—$C(H)=CH_2$ wherein X=6, 8, 10, 12, 14, 16, 18 in the respective relative amounts of about 3%, 50%, 31%, 10%, 3%, 2% and 1%, said monomer having an weight average molecular weight of 569; 119.5 parts of a monomer of formula II, N,N-diethylaminoethyl methacrylate; 19 parts of a monomer of formula III, glycidyl methacrylate; and 505 parts of methyl isobutyl ketone (MIBK). The charge was purged with nitrogen at 40° C. for 30 minutes. "VAZO" 67 (0.6 parts) available from E. I. du Pont de Nemours and Co., Wilmington, Del. was then added to initiate polymerization and the charge was stirred for 16 hours at 70° C. under nitrogen.

A mixture of water (2435 parts) and acetic acid (59.5 parts) at room temperature was added to the above copolymer mixture at 70° C. The reflux condenser was replaced with a distillation column and the MIBK was removed at reduced pressure. A total of 3103 parts of copolymer solution was obtained. The copolymer solids (23.1%) contained 82.2% perfluoroalkylethyl methacrylate units, 15.4% N,N-diethylaminoethyl methacrylate units and 2.4% glycidyl methacrylate units.

The polymer from above was applied to waterleaf paper (34 lb/3000 sq ft)(15 kg/288 m²) by immersing the paper into one of several treating solutions, and then passing the treated paper between squeeze rollers. Treating solutions were made by dispersing the above copolymer in 50 ppm hard water and hydroxyethylated starch. The concentrations of copolymer in the treating solutions were adjusted to deposit 0.04%, 0.05%, 0.06%, 0.07%, 0.08% or 0.10% fluorine, respectively, and 2.4% starch on the paper. The treated paper was cured in a heat press at 260° F. (127° C.) for 2 minutes and tested for oil, grease, solvent and water repellency. The oil, grease, solvent and water repellency results for Example 1 and a comparative commercial sample A are summarized in Table 1 below. Based on information in the FDA Register, commercial sample A is an emulsion copolymer of a fluoro acrylate, 2-ethoxyethyl acrylate, diethylaminoethyl methacrylate methyl chloride salt, glycidyl methacrylate, and octyl mercaptan using as emulsifier an ethoxylated amine salt and the polymerization process using a water soluble free radical initiator. It is available as "SCOTCHBAN" FC845 from Minnesota Mining and Manufacturing Co. (3M) of Minneapolis, Minn.

The Cobb Size results are an average of two trials. The Ralston-Purina Grease test is an average of four trials. The Turpentine Test is an average of two trials, with a "+" after a result indicating that a reading of at least 1800 seconds was obtained in at least one trial.

TABLE 1

Oil, Water, Solvent and Grease Repellency on 34 Lb Waterleaf Paper

| Sample | Fluorine Wt % | Oil Kit | Ralston-Purina | Turpentine Resistance | Cobb Size |
| --- | --- | --- | --- | --- | --- |
| Ex. 1 | 0.04% | 7 | 9 | 420 | 37 |
|  | 0.05% | 8 | 0 | 1800+ | 23 |
|  | 0.06% | 8 | 0 | 1800+ | 23 |
|  | 0.07% | 10 | 0 | 1800+ | 25 |
| A | 0.04% | 6 | 100 | 30 | 37 |
|  | 0.06% | 7 | 0 | 580 | 28 |
|  | 0.08% | 9 | 0 | 1380+ | 27 |
|  | 0.10% | 10 | 0 | 1420+ | 23 |

The copolymer from Example 1 clearly shows better oil and solvent repellencies at comparable fluorine levels in the Turpentine Test for Grease Resistance and the Ralston-Purina Grease Resistance test at lower applied fluorine levels. The Cobb Size test results show little difference for the two fluoropolymers.

EXAMPLE 2

This example demonstrates the comparative performance of a copolymer prepared according to the teachings of U.S. Pat. No. 4,147,851: i.e., a copolymer prepared without the above third component (c), a monomer of Formula III or IV, or a mixture thereof.

A vessel fitted with a stirrer, thermometer and reflux condenser was charged with 70 parts of a fluoromonomer of formula I having the formula:

$$CF_3CF_2(CF_2)_xC_2H_4C-O-C(O)-C(CH_3)=CH_2$$

wherein X=4, 6, 8, 10, 12, 14, 16, 18, 20 in the respective relative amounts of about 5%, 35%, 30%, 14%, 6%, 4%, 3%, 2% and 1%, said monomer having an weight average molecular weight of 543; 30 parts of a monomer of formula II, N,N-diethylaminoethyl methacrylate; and 100 parts of isopropanol. The charge was purged with nitrogen for 30 minutes at 30° C. "VAZO" 67 (0.5 parts) available from E. I. du Pont de Nemours and Co., Wilmington, Del. was then added to initiate polymerization and the charge was stirred for 18 hours at 65° C. under nitrogen.

Peracetic acid (24.3 parts of a 42% solution in acetic acid) was dripped into the the copolymer solution at 65° C. On completion of the addition the reaction mass was stirred for an additional hour at 65° C. Water (200 parts) was added to the above copolymer mixture yielding a total of 414 parts of copolymer solution with solids (24%) containing about 70% perfluoroalkylethyl methacrylate units and about 30% N,N-diethylaminoethyl methacrylate amine oxide units. The above polymer solution is used as is, or is distilled at atmospheric or reduced pressure.

The polymer from Example 2 was applied to unbleached Kraft paper (56 lb/3000 sq ft) (25 kg/288m$^2$) by immersing the paper into the treating solution, passing the treated paper between squeeze rollers and curing in a heat press at 260° F. (127° C.) for 2 minutes. The treating solutions were made by dispersing the above copolymer in 50 ppm hard water and no starch. The wet pick-up of the paper was adjusted to deposit 0.06%, 0.08%, and 0.10% fluorine. The oil and water repellency results are summarized in Table 2. Included in Table 2 are data obtained by similarly applying Example 1 and commercial sample A.

TABLE 2

Oil, Water, Solvent and Grease Repellency on Unbleached Kraft Paper

| Sample | Fluorine Wt % | Oil Kit | Ralston-Purina | Turpentine Resistance | Cobb Size |
|---|---|---|---|---|---|
| Ex. 1 | 0.04% | 5 | 22 | 30 | 52 |
|  | 0.06% | 7 | 0 | 1020+ | 26 |
|  | 0.08% | 8 | 0 | 1740+ | 25 |
|  | 0.10% | 9 | 0 | 1800+ | 26 |
| Ex. 2 | 0.04% | 5 | 0 | 45 | 25 |
|  | 0.06% | 6 | 0 | 150 | 24 |
|  | 0.08% | 7 | 0 | 180 | 24 |

TABLE 2-continued

Oil, Water, Solvent and Grease Repellency on Unbleached Kraft Paper

| Sample | Fluorine Wt % | Oil Kit | Ralston-Purina | Turpentine Resistance | Cobb Size |
|---|---|---|---|---|---|
| A | 0.10% | 7 | 0 | 1470+ | 23 |
|  | 0.04% | 5 | 47 | 90 | 25 |
|  | 0.06% | 6 | 0 | 300 | 24 |
|  | 0.08% | 7 | 0 | 1800+ | 24 |
|  | 0.10% | 9 | 0 | 1800+ | 24 |

The above table demonstrates that the inventive copolymer from Example 1 is signicantly superior to that prepared in Example 2 in the Oil Kit and Turpentine Resistance Tests, although inferior at the 0.04% fluorine level in the Ralston-Purina Grease Resistance Test. The Example 1 copolymer exhibits generally similar overall performance to the sample A on this particular paper.

Figure 1B:
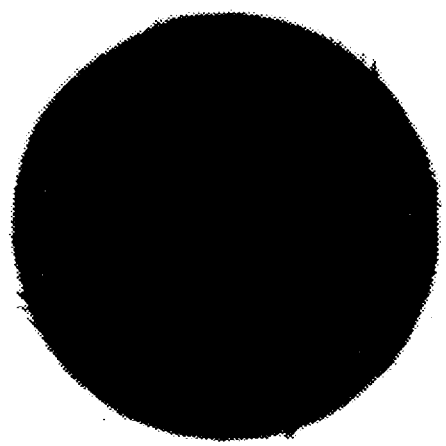
Figure 1C:
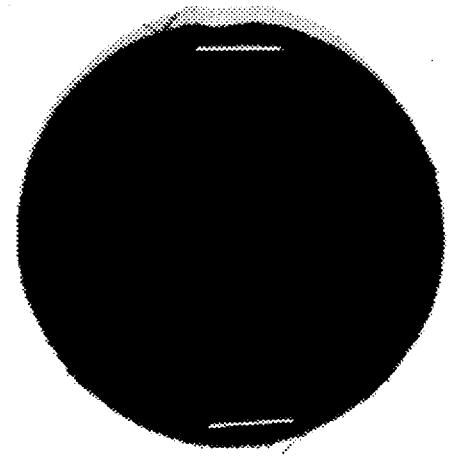

The most striking difference in performance of the above copolymers is their dispersion stability under high shear conditions. This was tested in the following manner. A solution of each copolymer in water was prepared by adding a dispersion containing 10 parts of polymer solids to 90 parts of distilled water. This was circulated through a Viking gear pump at an approximate rate of 1200 milliliters/minute and a temperature of 30° C. for 3.5 hours. The recirculated copolymer solution was next filtered through a black filter cloth and examined for insoluble residue. Copies of the resulting filter cloths are shown in FIG. 1. The copolymers from Examples 1 and 2 filtered cleanly through the filter cloth leaving no residue. The recirculated commercial sample A showed excessive white polymeric deposits, indicating poor dispersion stability under these high shear conditions.

EXAMPLES 3 to 9

Examples 3 to 9 were prepared according to the general procedures exemplified by either Example 1 or Example 2, with appropriate changes as required depending on whether an acrylate, methacrylate or other fluoromonomer of Formula I was used, whether a third component (c)(a monomer of Formula III or IV or mixture thereof) was added or not, and whether the resulting copolymer was reacted with acetic acid or peracetic acid. The compositions of copolymer examples 3 to 9 as so prepared are summarized in Table 3 below in weight %: For ease of reference, the composition of the copolymer prepared in example 1 is also included.

TABLE 3

Compositions of Copolymer Examples 3 to 9

| EXAMPLE | Monomer of Formula I | | | Monomer of Formula II | Monomer of Formula III or IV | Quaternizing Agent | |
|---|---|---|---|---|---|---|---|
|  | Acryl/ | Meth/ | FX-14 | DEAM | GMA | Acetic | Peracetic |
| 1 | 82 | — | — | 15.4 | 2.4 | 6.8 | — |
| 3 | 82 | — | — | 15.4 | 2.4 | — | 3.2 |
| 4 | — | 82 | — | 15.4 | 2.4 | 6.0 | — |
| 5 | 80 | — | — | 20 | — | — | 8.2 |
| 6 | 80 | — | — | 20 | — | 11.3 | — |

TABLE 3-continued

Compositions of Copolymer Examples 3 to 9

| EXAMPLE | Monomer of Formula I | | | Monomer of Formula II | Monomer of Formula III or IV | Quaternizing Agent | |
|---|---|---|---|---|---|---|---|
| | Acryl/ | Meth/ | FX-14 | DEAM | GMA | Acetic | Peracetic |
| 7 | — | 70 | — | 30 | — | 5.7 | — |
| 8 | — | — | 70 | 30 | — | — | 12.3 |
| 9 | — | — | 74 | 26 | — | 7.7 | — |

Notes: The peracetic acid used was a 32% by weight solution in acetic acid. The monomer of Formula I used in Examples 8 and 9 was a commercially available fluoromonomer FX-14 available from the 3M Company, Minneapolis, Minn. Acryl. stands for acrylate. Meth. stands for methacrylate. DEAM stands for diethylaminoethyl methacrylate. GMA stands for glycidyl methacrylate.

The copolymers from Examples 3 to 9 were applied to unbleached Kraft paper (56 lb/3000 sq ft) by immersing the paper into the treating solution, passing the treated paper between squeeze rollers and curing in a heat press at 260° F. (127° C.) for 2 minutes. The treating solutions were made by dispersing the above copolymer in 50 ppm hard water. The wet pick-up of the paper was adjusted to deposit 0.06%, 0.08%, and 0.10% fluorine. Repellency results are summarized in Table 4. ND indicates not determined. Comparable tests from Table 2 for the copolymer of Example 1 are included for easy reference.

TABLE 4

Repellency Tests on Examples 3 to 9 on Unbleached Kraft Paper

| Sample | Fluorine Wt % | Oil Kit | Ralston—Purina | Turpentine Resistance |
|---|---|---|---|---|
| Ex. 1 | 0.04% | 5 | 22 | 30 |
| | 0.06% | 7 | 0 | 1020+ |
| | 0.08% | 8 | 0 | 1740+ |
| | 0.10% | 9 | 0 | 1800+ |
| Ex. 3 | 0.04% | 2 | 0 | 60 |
| | 0.06% | 4 | 0 | 1050 |
| | 0.08% | 5 | 0 | 810 |
| | 0.10% | 6 | 0 | 1800+ |
| Ex. 4 | 0.06% | 0 | 52 | 30 |
| | 0.10% | 4 | 0 | 60 |
| Ex. 5 | 0.06% | 6 | 0 | 150 |
| | 0.10% | 7 | 0 | 1800+ |
| Ex. 6 | 0.05% | 1 | 5 | 105 |
| | 0.08% | 5 | 0 | 30 |
| Ex. 7 | 0.04% | 5 | 14 | 90 |
| | 0.06% | 6 | 1 | 150 |
| | 0.08% | 6 | 11 | 105 |
| | 0.10% | 6 | 12 | 300 |
| Ex. 8 | 0.06% | 4 | 0 | 30 |
| | 0.10% | 6 | 0 | 105 |
| Ex. 9 | 0.05% | 5 | 24 | ND |
| | 0.08% | 6 | 0 | ND |

The copolymer of Example 3 is similar to that of Example 1 except that it is reacted with peracetic acid instead of acetic acid. While Example 3 shows improvement over Example 1 in the Ralston-Purina Test, it is inferior in the Kit and Turpentine Resistance Tests.

The copolymer of Example 4 is similar to that of Example 1 except for use of a methacrylate with a broader distribution of perfluoroalkyl chain length than the acrylate. Example 4 is much inferior to Example 1 in oil, turpentine and grease repellency.

The copolymers of Example 5 and 6 which lack the small amount of monomer of Formula III or IV found in Example 1 are inferior in turpentine and oil resistance.

The copolymer of Example 7 is prepared according to the teachings of U.S. Pat. No. 4,147,851 and is clearly deficient in the oil, Ralston-Purina and turpentine tests.

The copolymers of Examples 8 and 9 are also deficient in these tests compared to Example 1.

What is claimed is:

1. A copolymer composition for treating paper and paper products to impart water, oil or grease repellency comprising monomers copolymerized in the following percentages by weight:

(a) from about 60% to about 90% of at least one monomer of formula I:

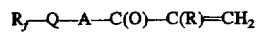

$$R_f-Q-A-C(O)-C(R)=CH_2 \quad \text{I}$$

wherein $R_f$ is a straight or branched-chain perfluoroalkyl group containing from 2 to about 20 carbon atoms, R is H or $CH_3$, A is O, S, or N(R'), wherein R' is H or an alkyl of from 1 to about 4 carbon atoms, Q is alkylene of 1 to about 15 carbon atoms, hydroxyalkylene of 3 to about 15 carbon atoms, $-(C_nH_{2n})$ $(OC_qH_{2q})_m-$, $-SO_2-NR'(C_nH_{2n})-$, or $-CONR'(C_nH_{2n})-$, wherein R' is H or alkyl of from 1 to about 4 carbon atoms, n is 1 to about 15, q is 2 to about 4, and m is 1 to about 15;

(b) from about 10% to about 40% of at least one monomer of formula II:

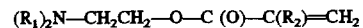

$$(R_1)_2N-CH_2CH_2-O-C(O)-C(R_2)=CH_2 \quad \text{II}$$

wherein $R_1$ is an alkyl group containing from 1 to 3 carbon atoms, $R_2$ is H or an alkyl radical of 1 to about 4 carbon atoms, and wherein the nitrogen is from about 40% to 100% salinized; and, (c) from about 1% to about 7% of at least one monomer of formula III or IV, or a mixture thereof:

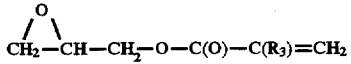

$$\underset{CH_2-CH-CH_2-O-C(O)-C(R_3)=CH_2}{\overset{O}{\diagup\diagdown}} \quad \text{III}$$

or

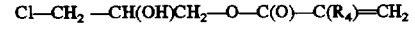

$$Cl-CH_2-CH(OH)CH_2-O-C(O)-C(R_4)=CH_2 \quad \text{IV,}$$

wherein $R_3$ and $R_4$ are each independently H or the same or different alkyl radical of 1 to about 4 carbon atoms.

2. The composition of claim 1 wherein for the monomer of formula I, $R_f$ is a straight chain perfluoroalkyl group of 2 to about 20 carbon atoms, A is O, and Q is alkylene of 1 to about 15 carbon atoms.

3. The composition of claim 1 wherein formula I is perfluoroalkylethyl acrylate, formula II is diethylaminoethyl methacrylate, and Formula III is glycidyl methacrylate.

4. The composition of claim 3 wherein the monomer of Formula I is $CF_3CF_2(CF_2)_xC_2H_4OC(O)-C(H)=CH_2$ wherein x is an even integer from 6 to 18 or mixtures thereof.

5. A method of treating paper or paper products to impart water, oil or grease repellency comprising application to the surface of the paper or paper product, or addition to the pulp prior to paper or paper product formation, of an effective amount of a composition comprising monomers copolymerized in the following percentages by weight:

(a) from about 60% to about 90% of at least one monomer of formula I:

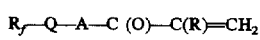   I wherein $R_f$ is a straight or branched-chain perfluoroalkyl group containing from 2 to about 20 carbon atoms, R is H or $CH_3$, A is O, S, or N(R'), wherein R' is H or an alkyl of from 1 to about 4 carbom atoms, Q is alkylene of 1 to about 15 carbon atoms, hydroxyalkylene of 3 to about 15 carbon atoms, $-(C_nH_{2n})(OC_qH_{2q})_m-$, $-SO_2-NR'(C_nH_{2n})-$, or $-CONR'(C_nH_{2n})-$, wherein R' is H or alkyl of from 1 to about 4 carbon atoms, n is 1 to about 15, q is 2 to about 4, and m is 1 to about 15;

(b) from about 10% to about 40% of at least one monomer of formula II:

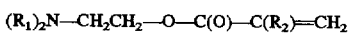   II wherein $R_1$ is an alkyl group containing from 1 to 3 carbon atoms, $R_2$ is H or an alkyl radical of 1 to about 4 carbon atoms, and wherein the nitrogen is from about 40% to 100% salinized; and, (c) from about 1% to about 7% of at least one monomer of formula III or IV, or a mixture thereof:

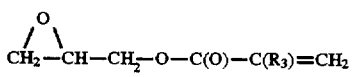   III or

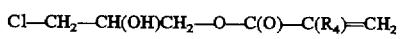   IV, wherein $R_3$ and $R_4$ are each independently H or the same or different alkyl radical of 1 to about 4 carbon atoms.

6. The method of claim 5 wherein the effective amount is such to deposit from about 0.04 to about 0.10 weight percent fluorine.

7. The method of claim 6 wherein formula I is perfluoroalkylethyl acrylate, formula II is diethylaminoethyl methacrylate, and formula III is glycidyl methacrylate.

8. A paper or paper product which has been treated with a composition comprising monomers copolymerized in the following percentages by weight:

(a) from about 60% to about 90% of at least one monomer of formula I:

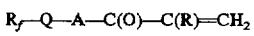   I wherein $R_f$ is a straight or branched-chain perfluoroalkyl group containing from 2 to about 20 carbon atoms, R is H or $CH_3$, A is O, S, or N(R'), wherein R' is H or an alkyl of from 1 to about 4 carbom atoms, Q is alkylene of 1 to about 15 carbon atoms, hydroxyalkylene of 3 to 15 carbon atoms, $-(C_nH_{2n})(OC_qH_{2q})_m-$, $-SO_2-NR'(C_nH_{2n})-$, or $-CONR'(C_nH_{2n})-$, wherein R' is H or an alkyl of from 1 to about 4 carbon atoms, n is 1 to about 15, q is 2 to about 4, and m is 1 to about 15;

(b) from about 10% to about 40% of at least one monomer monomers of formula II:

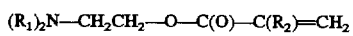   II wherein $R_1$ is an alkyl group containing from 1 to 3 carbons, $R_2$ is H or an alkyl radical of 1 to about 4 carbon atoms, and wherein the nitrogen is from about 40% to 100% salinized; and, (c) from about 1% to about 7% of at least one monomer of formula III or IV, or a mixture thereof:

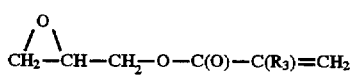   III or

   IV, wherein $R_3$ and $R_4$ are each independently H or the same or different alkyl radical of 1 to about 4 carbon atoms.

9. A paper or paper product of claim 8 having a fluorine content of from about 0.04% to about 0.10% by weight.

* * * * *